UNITED STATES PATENT OFFICE.

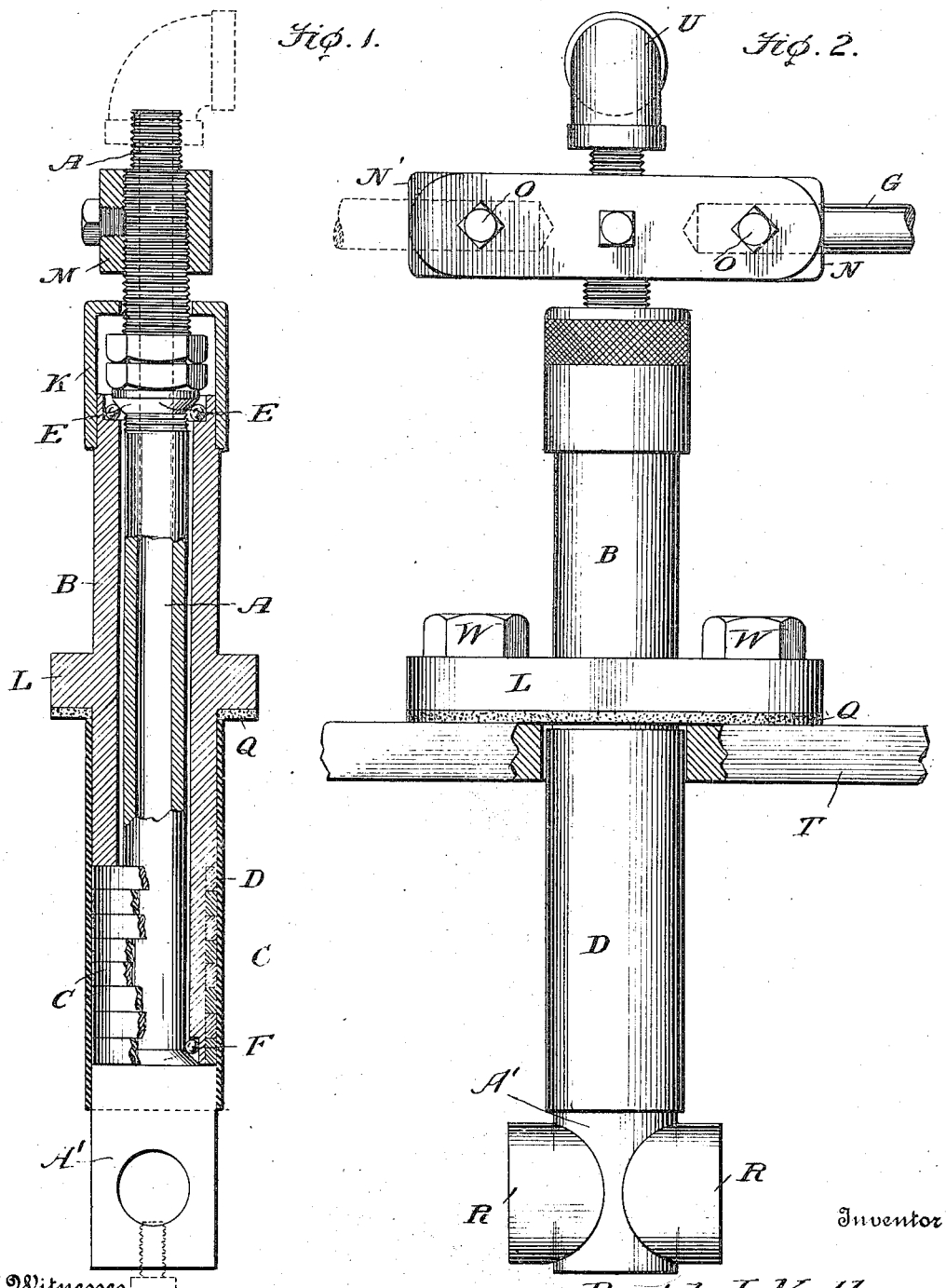

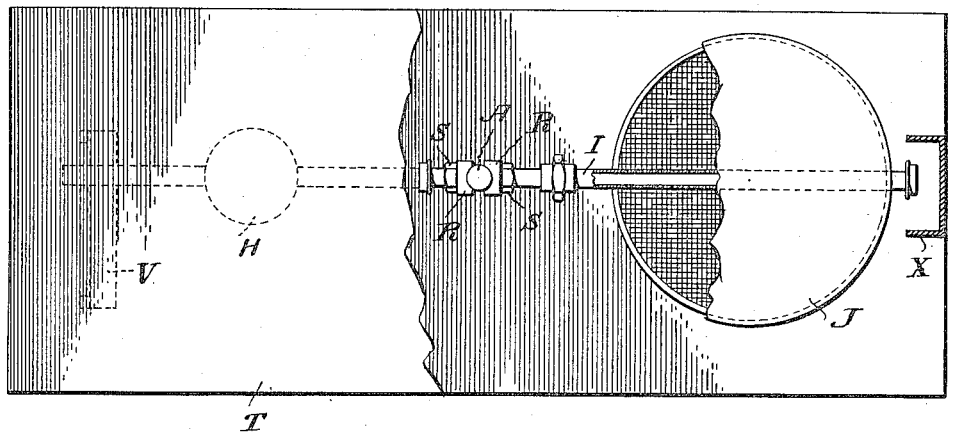
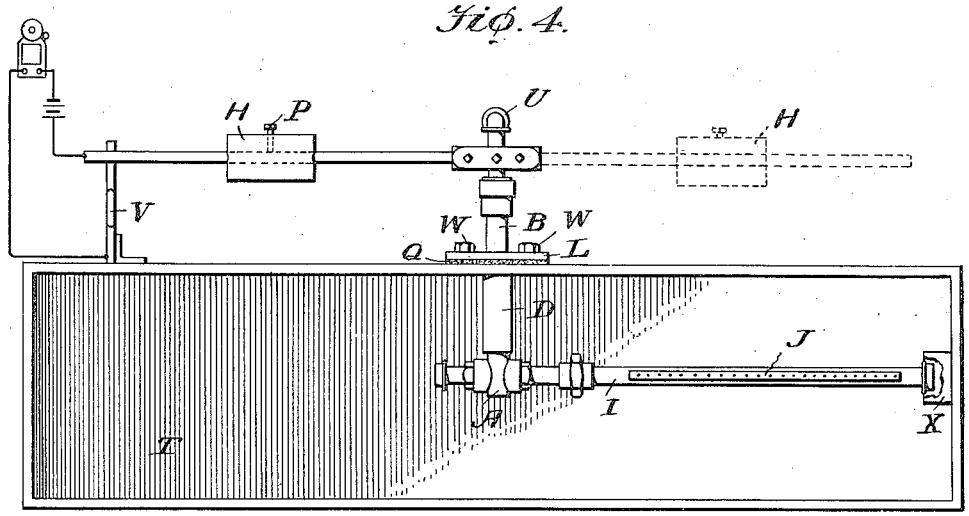

DAVID J. KELLY, OF SALT LAKE CITY, UTAH; A. H. KELLY, ADMINISTRATOR OF SAID DAVID J. KELLY, DECEASED, ASSIGNOR TO THE KELLY FILTER PRESS COMPANY, OF SALT LAKE CITY, UTAH, A CORPORATION OF UTAH.

BEARING.

1,130,674. Specification of Letters Patent. Patented Mar. 2, 1915.

Application filed September 26, 1913. Serial No. 792,030.

*To all whom it may concern:*

Be it known that I, DAVID J. KELLY, a citizen of the United States, residing at Salt Lake City, in the county of Salt Lake and State of Utah, have invented certain new and useful Improvements in Bearings, of which the following is a specification.

This invention relates to means which are ordinarily employed for the purpose of transmitting rotary motion from the interior of a hollow receptacle containing a liquid, of a fluid under pressure, to the exterior thereof, as in the case of ordinary stuffing-boxes; and the invention consists of the parts and the constructions, arrangements and combinations of parts substantially as hereinafter described and claimed.

In the accompanying drawings forming part of this specification and in which similar reference characters indicate like parts in the several views, Figure 1 is a longitudinal sectional view, partially in elevation, of a fluid-tight bearing embodying my invention. Fig. 2 is a plan view of the same, showing a portion of a tank or receptacle to which the bearing is secured. Fig. 3 is a side elevation of a tank provided with my improved fluid-tight bearing and containing a movably-mounted float, a part of the tank being broken away. Fig. 4 is a top plan view of Fig. 3.

The construction set forth in the drawings and which shows one embodiment of my invention, is intended to permit partial rotation of an element, as a shaft, in opposite directions alternately, and is not intended to permit continuous rotation in one direction only.

It is well understood by those skilled in the art that in the ordinary stuffing-boxes, there is friction between the packing and the rotating member which is a serious draw-back where sensitiveness is required. If the tension is relaxed on the packing, leakage is liable to occur, and this is objectionable for obvious reasons. It will also be understood that the end thrust caused by the difference in pressure upon opposite ends of a rotating member, and usually taken up by a so-called thrust bearing commonly causes friction. To overcome the foregoing and other difficulties which are often met with where a liquid tight joint is of importance, is a leading object of the present invention.

While my invention may be used in different relations and wherever it is desirable to produce a liquid-tight bearing or joint for a rotatable part, which is designed to tightly seal the joint against external pressure, such as the pressure which would be exerted against the exterior of the joint where the joint is exposed to an internal pressure, within a tank or vessel, I have primarily in view the use of the present invention in connection with apparatus for filtering slimes and the like, such as is disclosed in my prior patent No. 1,024,082, dated April 23, 1912. I desire it understood, however, that the present invention is not limited to the type of apparatus therein shown; that it has broader application and that it may be used in any connection where it is desired to produce a fluid-tight joint for an element which is designed for rotation in opposite directions alternately, wherever the employment of an element of substantially this character may be found useful.

For present purposes I have shown my invention, in Figs. 3 and 4, as associated with a suitably constructed tank, or receptacle, T, capable of holding a fluid such as mineral slimes pulp, which tank may be open at the top if the same is to be used with some form of suction apparatus, for withdrawing the contents of the tank; the tank may also represent one of a closed type intended to be associated with mechanism for producing an internal pressure, or with pressure feeding means. These features, however, form no part of my present invention and hence they are not illustrated in detail.

My improved bearing, which is the leading characteristic of the present invention, consists of a rotatable shaft, A, which may be either solid or hollow and is herein shown hollow, certain portions of the shaft being preferably enlarged to form thrust collars, E, F, and the inner end of said shaft being further enlarged to form a head, A', provided with a lateral opening, adapted to receive an arm, I, of a float or like part, which I will hereinafter describe, the arm of said float extending through the lateral opening of the shaft, A, and being removably secured to the shaft by means of clamps, R, and nuts, S, as indicated in Fig. 3.

Surrounding the shaft, A, and extending for the full length of the portion thereof included between the thrust collars, is a sleeve or casing, B, the interior diameter of which approximates the exterior diameter of that portion of the shaft between the aforesaid collars, and the ends of the collar being recessed to form appropriate seats between which and the thrust collars a series of balls or like elements are employed to form an antifriction bearing and which bearing may represent any approved and well known form of thrust-bearing.

The central portion of the sleeve or casing, B, is provided with a flange, L, adapted to be fitted to an exterior side or wall of the tank or vessel to which my invention is shown applied, and to be secured thereto by means of appropriate nuts, W. If desired, a packing, Q, may be introduced between the flange and the wall of the tank to better secure the joint at this point.

The inner end of the sleeve and by which end I mean the part which enters the tank and is submerged in the contents thereof, and is subjected to the pressure of the tank, is preferably turned down, as shown in Fig. 1, and is provided with a series of packing rings, or bands, C, of suitable material, and whose exterior diameter is about equal to the exterior diameter of the sleeve, or casing, B, said rings being contained between the shoulder formed by reducing the inner end of the sleeve or casing and the thrust collar adjacent the enlarged portion or head of the shaft.

Fitting over that portion of the sleeve or casing which enters the tank is a flexible tube, D, of appropriate material, preferably pure gum, said tube having sufficient length to not only embrace the portion of the casing immediately below or to one side of the flange, L, thereof, but to extend over the series of rings, C, and sufficiently beyond the inner end of the sleeve or casing as to permit it to receive and cover the adjacent end of the enlargement or head of the shaft, A, as clearly indicated in Fig. 1, the purpose of which construction, will be hereinafter described.

The outer end of the sleeve, B, is threaded or otherwise formed to detachably receive a hollow cap, K, having a central opening through which projects the threaded extended end of said shaft. Embracing the shaft and contained within the cap are suitable lock-nuts, Y, adapted to adjust the ball bearings, E and F, in the usual manner.

On the threaded exterior portion of the shaft, A, is secured a removable cross-piece, M, the opposite ends of which are provided with sockets, or the like adapted to detachably receive, at either side of the cross piece, the inner end of an arm, G, said arm being fixedly secured to the cross-piece by means of a bolt, O, or other securing device, and the cross-piece itself being rigidly locked to the shaft by a bolt or other fastening, whereby a rocking movement of the arm will be transmitted to the shaft to impart partial rotation thereto. In Fig. 1, the shaft is shown as being hollow and to the outer extremity of said shaft is connected an elbow or coupling, U, which will furnish means for the attachment of a suction apparatus, when the same is used for drawing the contents of the tank from the interior to the exterior thereof, as I will presently show.

Upon the arm, G, is a weight, H, which is capable of adjustment thereon and of being held in any adjusted position by means of a set screw, P, or analogous part, the outer end of the arm extending through a slotted guide, V, if desired, as shown in Figs. 3 and 4.

The arm, I, heretofore referred to, and which is secured to the inner or head end of the shaft, A, may represent either a solid shaft or a hollow tube. In the illustration used for present purposes, it is hollow and is supposed to connect with the interior of a float, or filter, J, to conduct from the interior of this filter the liquid which has passed through the filter to the interior thereof, and to deliver said liquid to the shaft, A, and thence to a point outside of the tank. If a filter is employed, the purpose and operation of the same may be substantially as disclosed in my aforesaid prior Patent No. 1,024,082, it being understood that such a filter is of a floating character and is adapted to be submerged in the liquid contents of the tank, and, where the tank contains slimes pulp or the like, the filter is designed to build upon the outside thereof a cake of solid matter separated from the liquid contents, which latter penetrate the walls of the filter and pass to the interior and from thence are conducted by the hollow arm, I, and hollow shaft, A, to the outside of the tank. This result is facilitated by attaching a suction device to the elbow or coupling member, U, when the tank, A, is of the open type, although it will be understood that when the tank is of the closed type and subjected to an internal pressure, the same result will occur because of the difference in pressure between the interior and exterior sides of the filter, as is well known in the art of filtering mineral slimes and the like.

From the foregoing it will be understood that whenever there is a difference in pressure between the opposite sides of the filtering cloth or surface, the liquid contents of the tank will be caused to pass through the filter and shaft, A, to an exterior point while the solid material is arrested upon the outer surface of the filter and thereby forms a cake. This accumulated deposit of solids weighs more than the surrounding slimes pulp, with which the tank is charged, and the gradually accumulating weight of this cake on the filter which is located at one side of the shaft, A, will overbalance the weight, H, on the arm, G, which is fixed to the rotatable shaft, whenever the weight of the cake exceeds that of the weight, H, and when this occurs the filter will gradually sink more deeply into the surrounding fluid. It will be understood that the point at which the weight, H, will be overcome by the accumulated collection of solids on the filter may be regulated at pleasure by shifting the weight, H, along the arm, G.

The shaft, A, and this shaft may represent a rod or like part, is designed to move very freely, and to this end I have provided ball-bearings at opposite ends thereof, and as the shaft is partially rotated, the elastic sleeve, B, which embraces the rings, C, and sleeve or casing, B, as also the enlarged head of the shaft, is placed under a slight torsion, but the rings, C, are loosely mounted on the reduced portion of the sleeve or casing, B, and are designed to move freely therearound as the elastic sleeve is placed in torsion. The rings support the central portion of the flexible sleeve against the pressure contained within the tank, T, or against any external pressure to which the flexible sleeve might be subjected, this flexible sleeve extending over a portion of the enlarged head of the shaft and also over a portion of the exterior of the sleeve or casing, B, so as to insure a good leak-proof joint between these parts.

It will be understood from this description that as pressure is applied to the submerged portion of my bearing, and which submerged portion will be that portion within the tank and subjected to the pressure thereof, the flexible sleeve will be caused to grip the parts which it covers and thereby prevent leakage. The ball bearing, F, receives the end thrust when pressure is applied to the tank, T, and makes the friction negligible. The stop, V, is designed to regulate the up and down travel of the free end of the float carrier arm, G, and, if desired, the stop and the arm may be wired in the usual manner for an electric signal, such as a bell or a light, the circuit being made when the arm, G, contacts with the stop, V. It will also be understood that the movement of the arm, G, which is controlled by the movement of the element which is carried by the arm, or shaft, I, may be employed to open or close valves, or in fact for any purpose designed for automatic control and where such up and down movement of an element may be used to advantage.

The character of guide employed for controlling the movement of the arm, G, is unimportant and, to this end, I have shown at X, another form of stop which will limit the rising and falling motion of the float. In this instance the stop is placed in the tank adjacent the float and the latter has a projecting part operating between the walls of the stop and limited in its motion thereby. In the case of the element, J, being a float, its weight varies in response to the depth of submergence of the float in the liquid, and the weight arm is moved up or down according to the variation in level of liquid contents of the tank.

The application of my improved bearing to cake indicators and float mechanism, referred to, is simply illustrative and I wish it understood that I do not limit my invention to these particular applications or to the art in which they have been used, but that I consider the invention as capable of more general application and as including any field in which the invention may be employed to advantage.

Having thus described my invention what I claim as new and desire to secure by Letters Patent is:—

1. A bearing comprising an outer casing, packing rings rotatably mounted on one end thereof, a shaft within the casing having an extended end enlarged to substantially the same diameter as the rings and adapted to make a thrust bearing against the end of the casing, and a flexible sleeve covering adjacent portions of the casing, the rings, the thrust bearing, and the extended portion of the rotatable shaft.

2. A bearing comprising an outer casing, a rotatable shaft mounted therein, and having ends projecting therefrom, a flexible sleeve embracing adjacent portions of the casing and shaft, and rings within the sleeve adapted to support said sleeve against external pressure and to provide for free torsional movement thereof.

3. In combination with a stationary casing and a shaft revolubly mounted therein, a bearing adapted to operate in a medium of fluid under pressure, said bearing comprising means for the prevention of leakage of fluids to the atmosphere, and said means including a flexible sleeve adapted to free torsional movement and covering a portion of the movable shaft and a portion of the stationary casing in which the shaft is rotatably mounted, and packing rings between the flexible sleeve and casing.

4. A bearing comprising a casing, a shaft rotatably mounted in and having its ends projecting through said casing, a flexible sleeve covering one of the projecting ends of the shaft and the adjacent portion of the casing, packing rings between the casing and sleeve and means for attaching the bearing to the pressure chamber to expose the flexible sleeve and the parts it covers to pressure inside of the chamber, the other end of the bearing leading to the atmosphere.

5. A bearing to transmit motion between the interior and exterior of a liquid container, or a fluid pressure receptacle, said bearing comprising a casing, means for attaching the casing to the receptacle, a rotatable shaft mounted in and projecting from the ends of the casing, a flexible sleeve covering a portion of the stationary casing and a portion of the rotatable shaft inside the receptacle, ball-bearings to provide for end thrust and rotation of the shaft, an annular packing on the casing for supporting the flexible sleeve against external pressure, and an exterior extension of the shaft for transmitting motion to or from the interior of the receptacle.

6. A fluid-tight bearing comprising two coacting members one disposed within the other, one of said members being rotatable relatively to the other, and means engaging both of said members and subjected to a torsional tension when said movable member is partially rotated with respect to the companion fixed member, and a packing between said means and one of said members and subjected to the pressure of the torsional tension of the former.

In testimony whereof I affix my signature in presence of two witnesses.

DAVID J. KELLY.

Witnesses:
G. F. SUMMERS,
J. C. CHATFIELD.